United States Patent [19]

Kliesch et al.

[11] Patent Number: 4,621,176

[45] Date of Patent: Nov. 4, 1986

[54] METHOD OF AND DEVICE FOR MONITORING AND/OR CONTROLLING WELDING CURRENT IN THE HIGH-FREQUENCY RESISTANCE PRESSURE WELDING OF PIPES WITH LONGITUDINAL SEAMS

[75] Inventors: Wilfried Kliesch, Iserlohn; Friedrich O. Koch, Unna-Massen; Hans J. Wahl, Münster; Rolf Krebs, Hamm; Peter Schorr, Münster; Heinz Straüch, Hagen-Emst, all of Fed. Rep. of Germany

[73] Assignee: Hoesch Werke Aktiengesellschaft, Dortmund, Fed. Rep. of Germany

[21] Appl. No.: 788,514

[22] Filed: Oct. 18, 1985

Related U.S. Application Data

[63] Continuation of Ser. No. 542,367, Oct. 17, 1983, abandoned.

[30] Foreign Application Priority Data

Oct. 20, 1982 [DE] Fed. Rep. of Germany ....... 3238766

[51] Int. Cl.⁴ ............................................. B23K 11/08
[52] U.S. Cl. ..................................... 219/8.5; 219/61.5
[58] Field of Search ........................ 219/8.5, 61.5, 110

[56] References Cited

U.S. PATENT DOCUMENTS 3,573,416 4/1971 Drechsler ...................... 219/61.5
4,254,323 3/1981 Takamatsu et al. ............ 219/61.5

FOREIGN PATENT DOCUMENTS 57-85679 5/1982 Japan ............................... 219/61.5
709297 1/1980 U.S.S.R. ........................... 219/61.5

Primary Examiner—Clifford C. Shaw
Attorney, Agent, or Firm—Max Fogiel

[57] ABSTRACT

It is necessary to determine welding temperature as precisely as possible in order to properly control the high-frequency welding of longitudinal pipes. Changes in welding temperature are proportional to alterations in the welding current that flows through the edges of the skelp. Magnetic-field sensors can be used to directly and precisely determine alterations in the current and hence changes in the temperature. Voltages induced in the sensors can be processed into setting signals to correct the high-frequency welding generator and disruptions in the current used to generate signals to mark the site of failure on the pipe for subsequent rejection.

13 Claims, 2 Drawing Figures

METHOD OF AND DEVICE FOR MONITORING AND/OR CONTROLLING WELDING CURRENT IN THE HIGH-FREQUENCY RESISTANCE PRESSURE WELDING OF PIPES WITH LONGITUDINAL SEAMS

This is a continuation of case Ser. No. 542,367 filed Oct. 17, 1983, now abandoned.

BACKGROUND OF THE INVENTION

The present invention relates to a method of and device for monitoring and/or controlling welding current in the high-frequency resistance pressure welding of pipes with longitudinal seams by detecting the magnetic fields generated by the welding current with a sensor.

The invention is based on that described in U.S. Pat. No. 3,573,416, from which the detection of welding currents behind the welding point from outside by means of magnetic measurements in the high-frequency welding of pipes with longitudinal seams is known. Other documents, German Offenlegungsschrift No. 1 925 965 for example, disclose similar solutions.

The drawback of the known methods is interference from magnetic fields that derive from the power lines leading to the welding equipment and that cannot be adequately screened out at the conventional welding frequencies of about 400 kHz. Other magnetic fields, such as those deriving from inductive annealing equipment like pipe-seam annealing equipment that may be being operated in the vicinity, can also interfere. Especially disruptive to detection of the current that flows through the edges of the skelp and heats them up, and which is of sole interest in this context, is something called pipe back current, which results from conductive, and even more from inductive, current coupling.

A very specific means of detecting welding phenomena and processing them to control welding energy is known from German Offenlegungsschrift No. 2 826 986. The device is, however, extremely expensive.

SUMMARY OF THE INVENTION

The object of the present invention is an uncomplicated method of monitoring and/or controlling a welding current that eliminates interference from nearby magnetic fields.

This object is attained in accordance with the invention by means of a method and device wherein the magnetic fields generated by the welding current are detected at the edges of the skelp and converted into a voltage, oscillations in the voltage are monitored and compared with given voltages that serve as references for the width of oscillation, and a setting signal is shaped to correct the welding current and or a marking device activated when the reference voltages are exceeded.

Since what actually determines effectiveness in welding together the open seams of a pipe that has been shaped out of skelp is only the current flowing through the edges of the skelp, it is desirable to be able to monitor that current, especially if and when it is subject to oscillations, which can be exploited to readjust the amount of welding power supplied.

One particular way of monitoring the current is to position a magnetic-field detector inside the pipe. The advantage of detecting the fields from inside the pipe is that the pipe will constitute a Faraday cage for high frequencies from the welding-current generator and screen out any interfering electromagnetic fields located outside the pipe. Furthermore, the resulting skin effect prevents any currents flowing along the outside surface of the pipe, aside from those flowing through the edges of the skelp along the open seam and which are decisive in high-frequency pressure welding, from penetrating inside. Thus, the magnetic fields deriving from the welding current can be measured almost without interference at the inside surface of the pipe.

There is, however, another advantage. Aiming several detectors, consisting of induction coils, at the magnetic field can lead to differentiated evidence as to what is occurring during the welding process, especially with respect to how the currents are distributed throughout the pipe. Still another advantage is that disruptions in the welding current that are of extremely short duration, like those resulting from cinder short circuiting, can be detected, which is not possible by conventional testing methods. Although such disruptions cannot of course be completely ruled out because even the control circuit has a certain amount of inertia, their site can be accurately indicated with a marking device or stored in a shift register and pursued or displayed.

It is practical to position the sensors exactly between the point of current supply (the induction coil or high-frequency contact) and the welding point (where the edges of the skelp come together between the upsets) directly below the edges of the skelp and inside the magnetic field deriving from the current flowing through the edges. No pipe back-current interference can usually be detected at this location. If necessary, the reverse pipe current can also be picked up with magnetic-field sensors inside the pipe and connected to the remaining welding current in the edges of the skelp.

When the high-frequency welding is conductive, the sensors can be mounted on the arm that supports the mandrel or interior-bead scraper.

When the high-frequency welding is inductive, it is practical to mount the sensors on the surface of the impeder. To prevent malfunction from damaged impeders the impeders in one embodiment of the invention are surrounded by an induction coil coupled to displays or signal devices so that the current induced in the coil can be monitored. Damage to or malfunction of the impeder will accordingly be immediately detected, preventing error on the part of the magnetic-field sensor.

The magnetic field is varied proportionally to changes in the welding current at the edges of the skelp.

Since varying the welding current leads to a proportional alteration in temperature in welding, this process is practically applicable as a means of measuring temperature. This is why it is so exceptionally significant for the high-frequency welding of pipes inasmuch as the methods of temperature measurement employed up to now, all of which have relied on optical pyrometry, have not been precise enough for optimum welding because of ambient conditions.

A preferred embodiment of the invention will now be described with reference to the attached drawings.

DETAILED DESCRIPTION OF THE PREFERRED EMBODIMENTS

Figure 1:
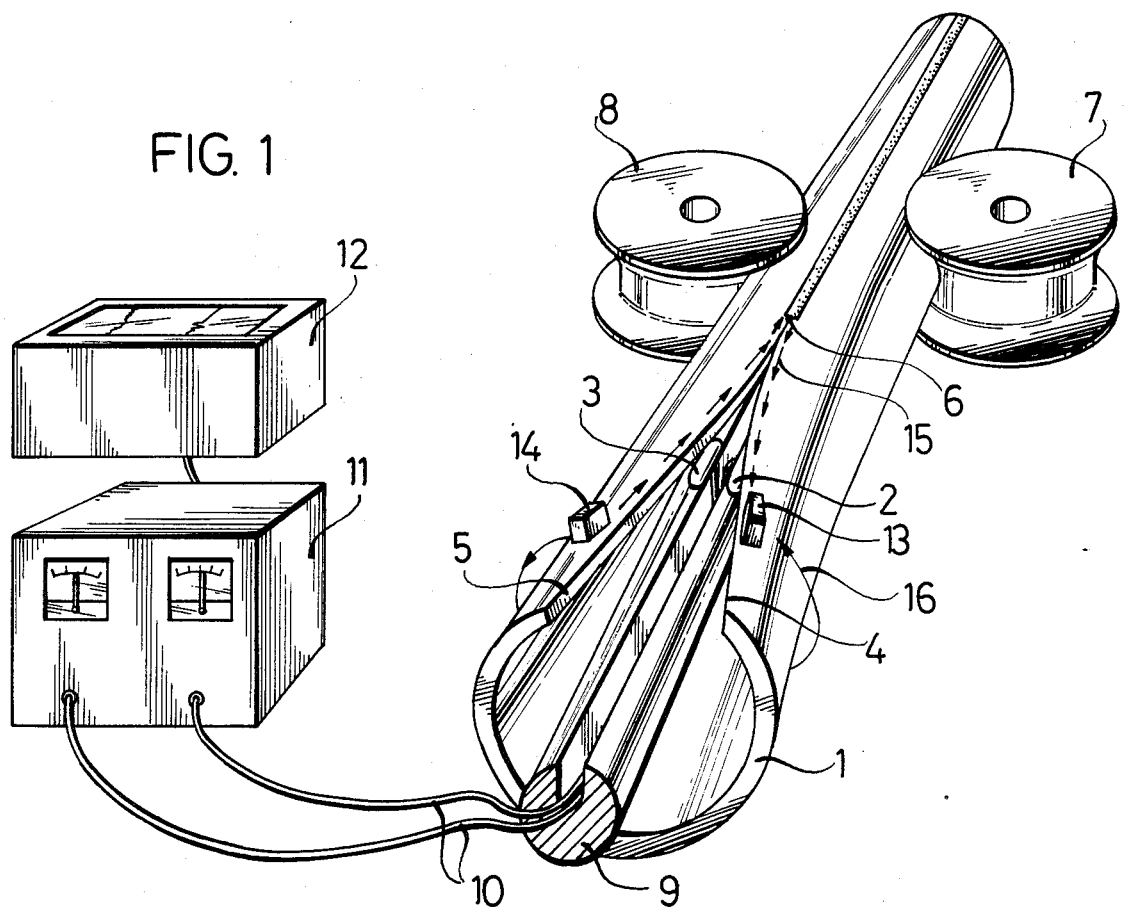
FIG. 1 illustrates the situation at a high-frequency welding bench while the open seam of a pipe is being welded together and FIG. 2 is a section across the pipe at the magnetic-field sensors.

An open-seamed pipe 1 is being pressure welded into a pipe with a closed longitudinal seam at a welding point 6. Welding pressure is applied by rolls 7 and 8 (FIG. 1). Welding energy is introduced conductively from a welding generator, not illustrated, through contact shoes 13 and 14 into pipe 1 and flows as a result of the skin effect in the form of a current 15 through the edges 4 and 5 of the skelp to welding point 6 and in the form of a back current around the pipe.

A magnetic-field sensor in the form of an induction coil 2 or 3 is mounted on supporting arm 9 between each contact shoe 13 or 14 and welding point 6 just below skelp edges 4 and 5 inside pipe 1. The lines 10 to coils 2 ad 3 lead separately out of pipe 1 so that the voltage induced in each coil can be determined independently with a measuring device 11 and a chart tracer 12.

Figure 2:
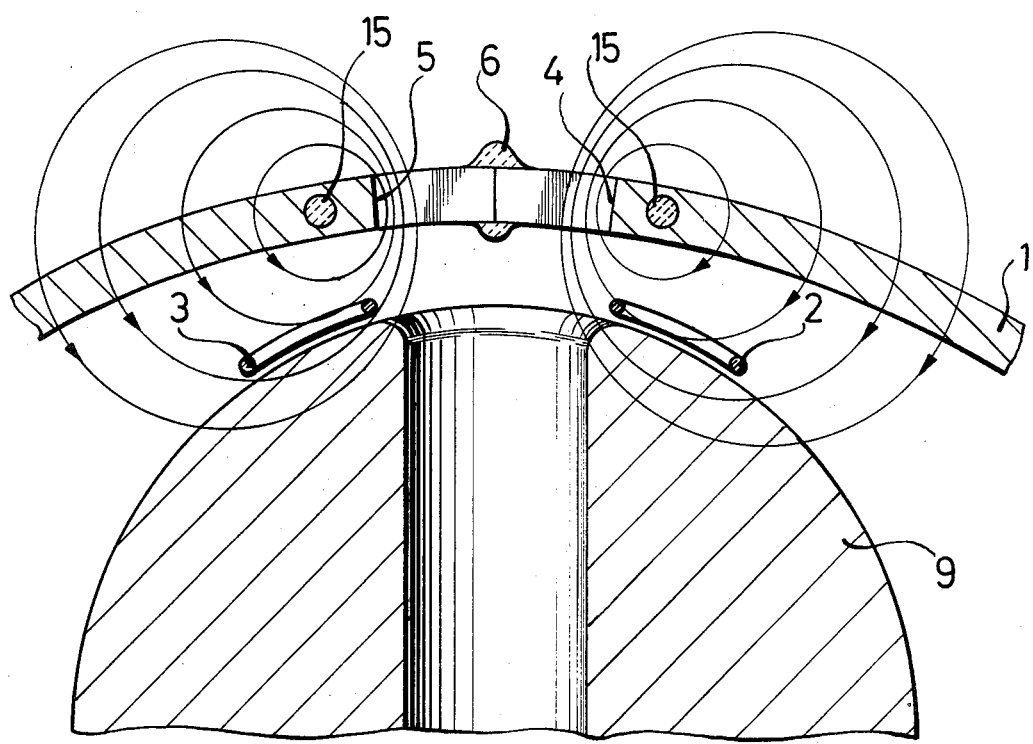

FIG. 2 is a larger-scale diagram of the opposing magnetic fields generated by welding current 15 in the edges 4 and 5 of the skelp being shaped into pipe 1. The induction coil 2 on supporting arm measures the magnetic field at edge 4 and the induction coil 3 the magnetic field at edge 5. Thus, the distribution of current through edges 4 and 5 can be detected independently. If, for example, the resistance between pipe 1 and contact shoe 13 or 14 changes on one or both sides as the result of scaling, the change will be registered.

Measuring device 11 contains limiting-value generators for maximum and minimum voltages, maximum and minimum proportional welding currents that is. When these levels are abruptly exceeded or fallen short of, as the result of a short circuit for example, a signal is released to a device, which is not illustrated, that marks the failure site on the pipe.

Voltage variation, changes in the welding current that is, can also be utilized to generate setting signals to correct the welding generator in order to keep the welding current constant.

The invention can also be designed with the sensors outside the pipe, in which case the sensor or coil must be very flat and protected with a screen.

We claim:

1. Method of monitoring and controlling welding current in high-frequency resistance pressure welding of pipes with longitudinal seams, comprising the steps of: detecting magnetic fields generated by the welding current with two sensors below edges of a skelp and in front of a welding point; converting the detected magnetic fields into a voltage, each of said sensors being separately located below one edge of the skelp for inducing a voltage thereinto and having a coil with a coil axis transverse to a pipe axis, voltage in the coil of one sensor being measured independently of voltage in the coil of the other sensor; monitoring oscillations in the voltage and comparing with reference voltages serving as references for width of oscillation; and shaping a setting signal to correct the welding current when said reference voltages are exceeded.

2. Method as defined in claim 1, wherein said magnetic fields are detected from inside the pipe.

3. Method as defined in claim 1, wherein one sensor is associated with each edge of the skelp.

4. Method as defined in claim 3, and converting deviations in detected strengths of magnetic fields between sensors into voltage signals that are utilized to control welding current.

5. Method as defined in claim 1, and positioning sensors between point of current supply and welding point.

6. Method as defined in claim 1, wherein said sensor comprises an induction coil.

7. Method as defined in claim 1, and recording detected oscillations in the magnetic fields.

8. Method as defined in claim 1, and supplying by sensor signals detected magnetic-field point oscillations that deviate from a given reference to a device marking a failure site on the pipe.

9. Method as defined in claim 1, and integrating sensors into an impeder positioned inside the pipe and surrounded by an induction coil to monitor the function of the impeder when the high frequency welding is inductive.

10. Method as defined in claim 1, and measuring in the pipe back current from inside the pipe and comparing with welding energy.

11. Apparatus for monitoring and controlling welding current in high-frequency resistance pressure welding of pipes with longitudinal seams, comprising: a high-frequency welding generator, current-transmission means, and a welding-current setter, two sensors for detecting magnetic fields generated by welding current and converting detected magnetic fields into a voltage being inside the pipe immediately in front of the welding point and below edges of the skelp; means for monitoring oscillations in the voltage and comparing with reference voltages serving as reference for width of oscillation; a voltage measuring device connected to said sensors and containing integrated limiting-value generators; and a reference-to-actual value comparator with means for shaping a setting signal to correct the welding current when said reference voltages are exceeded, said comparator being wired into controls connected to said welding-current setter each of said sensors being separately located below one edge of the skelp for inducing a voltage thereinto and having a coil with a coil axis transverse to a pipe axis, voltage in the coil of one sensor being measured independently of voltage in the coil of the other sensor.

12. Apparatus as defined in claim 11, and means coupled with said reference-to-actual value comparator for marking a failure site on the pipe.

13. Apparatus as defined in claim 11, wherein a sensor is integrated into an impeder, and an induction coil around said impeder.

* * * * *